Patented Aug. 13, 1940

2,211,695

UNITED STATES PATENT OFFICE 2,211,695

TREATMENT OF SODIUM HYDROXIDE

Everett C. Hughes, Cleveland, Ohio, assignor to The Standard Oil Company, Cleveland, Ohio, a corporation of Ohio No Drawing. Application December 1, 1937, Serial No. 177,542

3 Claims. (Cl. 23—184)

In U. S. Patent No. 2,020,032, there is set forth the purifying of sodium hydroxide by treating with a solution of sulphur in an organic solvent. I have now found that in some cases, a modification and amplification of that procedure affords particular manufacturing advantages and desirable results, and fitting in well with production requirements.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

A sodium hydroxide solution which is loaded up with mercaptides and in a condition no longer effective, and ready to be discarded, is, in accordance with the present invention, treated by the addition of elemental sulphur directly thereto, the amount preferably being equal to or one-half, with respect to combining weight, of the mercaptan sulphur present in the material. The elemental sulphur may be fed in controlled amount into the spent caustic solution by mechanical means feeding it in finely divided cold state, or preferably it may be added in molten form. A small portion of the caustic may be heated up above the melting point of sulphur and the sulphur then be introduced therein, and the sulphur is disseminated in very finely divided state. Thorough agitation is desirable. Reaction rapidly occurs, and may be advantageously improved by contacting the mixture with a sulphide catalyst, as a sulphide of lead or copper. During reaction, where desired an elevated temperature may be applied, up to about 212° F. Galena is for instance a desirable form of catalyst, and a convenient procedure is to pass the mixture over a bed of a catalyst, such as galena. Insoluble organic disulphides tend to separate. Separation may be very greatly facilitated by mixing the solution with a light hydrocarbon, as for instance a naphtha. On allowing the mixture to stratify, and removing the naphtha, the caustic soda solution is regenerated ready for reuse or it may be evaporated down for the recovery of sodium hydroxide in solid form.

In my application Ser. No. 59,316, filed January 15, 1936, there is claimed a process involving among other matters the carrying of sulphur initially into reaction dissolved in a hydrocarbon solvent.

Other modes of applying the principle of the invention may be employed, change being made as regards the details described, provided the features stated in any of the following claims, or the equivalent of such, be employed.

I therefore particularly point out and distinctly claim as my invention:

1. A process of purifying aqueous sodium hydroxide solutions containing mercaptides, which comprises mixing with such solution molten sulphur, passing the solution in contact with a sulphide of the group consisting of lead and copper, mixing the solution with an organic solvent immiscible with sodium hydroxide solution and in which the reaction product of sulphur and the mercaptide is soluble, and separating the organic solution from the aqueous sodium hydroxide solution.

2. A process of purifying aqueous sodium hydroxide solutions containing mercaptides, which comprises mixing with such solution elemental sulphur, passing the solution in contact with a sulphide of the group consisting of lead and copper, mixing the solution with an organic solvent immiscible with sodium hydroxide solution and in which the reaction product of sulphur and the mercaptide is soluble, and separating the organic solution from the aqueous sodium hydroxide solution.

3. A process of purifying aqueous sodium hydroxide solutions containing mercaptides, which comprises mixing with such solution elemental sulphur, contacting the solution with a sulphide catalyst, mixing the solution with an organic solvent immiscible with sodium hydroxide solution and in which the reaction product of sulphur and the mercaptide is soluble, and separating the organic solution from the aqueous sodium hydroxide solution.

EVERETT C. HUGHES.